(12) United States Patent
Shotey et al.

(10) Patent No.: US 8,584,324 B1
(45) Date of Patent: Nov. 19, 2013

(54) MOBILE CABLE HOLDER

(75) Inventors: Marcus J. Shotey, Scottsdale, AZ (US);
Richard L. Cleghorn, Tempe, AZ (US)

(73) Assignee: Hubbell Incorporated, Shelton, CT (US)

( * ) Notice: Subject to any disclaimer, the term of this patent is extended or adjusted under 35 U.S.C. 154(b) by 686 days.

(21) Appl. No.: 12/821,059

(22) Filed: Jun. 22, 2010

Related U.S. Application Data

(60) Provisional application No. 61/219,258, filed on Jun. 22, 2009.

(51) Int. Cl.
*F16L 3/23* (2006.01)
*B65D 67/02* (2006.01)
*F16B 2/10* (2006.01)

(52) U.S. Cl.
USPC .................. 24/134 R; 24/134 L; 24/132 WL; 24/16 R

(58) Field of Classification Search
USPC ....... 24/132 R, 134 L, 132 WL, 599.8, 600.1, 24/16 R; 70/16
See application file for complete search history.

(56) References Cited

U.S. PATENT DOCUMENTS

| 772,468 | A | * | 10/1904 | Maltby | ............................ 70/16 |
| 1,014,118 | A | * | 1/1912 | Carberry | ........................... 70/16 |
| 6,742,223 | B1 | * | 6/2004 | Chang | ............................. 24/130 |
| 7,500,643 | B2 | * | 3/2009 | Leone et al. | ..................... 248/56 |
| 7,900,324 | B2 | * | 3/2011 | Ginocchio | ................. 24/30.5 R |

* cited by examiner

*Primary Examiner* — Robert J Sandy
(74) *Attorney, Agent, or Firm* — Marcus R. Mickney; Mark S. Bicks; Alfred N. Goodman

(57) ABSTRACT

A device holder including a body having a receiving opening, an arm having an engagement member for releasably securing the engagement member within the receiving opening, a hinge rotatably connecting the body and the arm, a spring communicating with the arm and the body, and wherein the spring biases the arm and the body into a closed position.

20 Claims, 4 Drawing Sheets

MOBILE CABLE HOLDER

CROSS REFERENCE TO RELATED APPLICATIONS

This Application claims the benefit of the filing date of U.S. Provisional Patent Application 61/219,258 to Shotey et al. entitled "Mobile Cable Holder" which was filed on Jun. 22, 2009, the disclosure of which is herby incorporated herein by reference

BACKGROUND OF THE INVENTION

1. Technical Field

Aspects and implementations of the mobile cable holder relate to a mechanism and method for holding a cable, a hose, a wire, a flexible pipe, a rigid pipe, a rigid tube, a flexible tube, a rigid cylinder, a flexible cylinder, a chain, a cord, a rope, a coil, a line, a band, a lanyard, twine, a plurality of items, and/or the like.

2. Background Art

Cable holders and devices for bundling or storing items are well known. Traditional cable holders include a hand-cuff like element with jaws that are self-sustained in an open position while an item is bundled within the jaws. While jaws self-sustained in the open position ensure that the item can be located within the jaws, the user is required to manipulate the item and the jaws to encircle the item, thereby requiring a great deal of dexterity.

There are multiple variations of cable holders and devices known in the art including designs that use two separate jaws rotatably mounted together or a single piece unit that can flex to encircle the item. Nevertheless, cable holders require an inordinate amount of control to accomplish the goal of containing the item.

SUMMARY

This disclosure includes one or more device holder designs that permit the user to easily collect and store a variety of articles. A particular implementation employs a body and an arm spring biased together into a closed position.

A particular embodiment broadly comprises a device holder comprising a body having a receiving opening, an arm having an engagement member for releasably securing the engagement member within the receiving opening, a hinge rotatably connecting the body and the arm, a spring communicating with the arm and the body, and wherein the spring biases the arm and the body into a closed position.

In particular implementations, engagement of the engagement member and the receiving opening selectively prevents the holder from moving into an open position. The body and the arm may define an orifice for receiving an article. Further, a trigger may be operatively connected to the body for releasing the engagement of the engagement member and the receiving opening. Still further, an aperture may be located within the body and the trigger may be operable from within the aperture. A finger grip may extend from the body and be linked with the trigger.

In additional particular implementations, movement of the trigger may impart movement on the finger grip, while movement of the finger grip does not impart movement on the trigger. The arm may further comprise an extension member at least partially defining the engagement member and having a plurality of notches securing the arm within the receiving opening. Further, a size of the orifice may be controlled by selective engagement of the plurality of notches. The spring may be a torsion spring. The receiving opening may terminate within the body and the body may further comprise a lever at least partially surrounding the receiving opening. The lever may further comprise a projection extending into the receiving opening.

In still additional particular implementations, the projection may contact a plurality of notches on the engagement member. The projection may permit movement of the engagement member in a first direction and selectively prevent movement of the engagement member in a second direction opposite the first direction. The lever may be pivotably mounted to the body. The arm may be rigid or flexible. A lever may have projections outside of the receiving opening.

BRIEF DESCRIPTION OF THE DRAWINGS

Features of particular embodiments and implementations of device holders will hereinafter be described in conjunction with the appended drawings, where like designations denote like elements, and.

DETAILED DESCRIPTION

Figure 1:
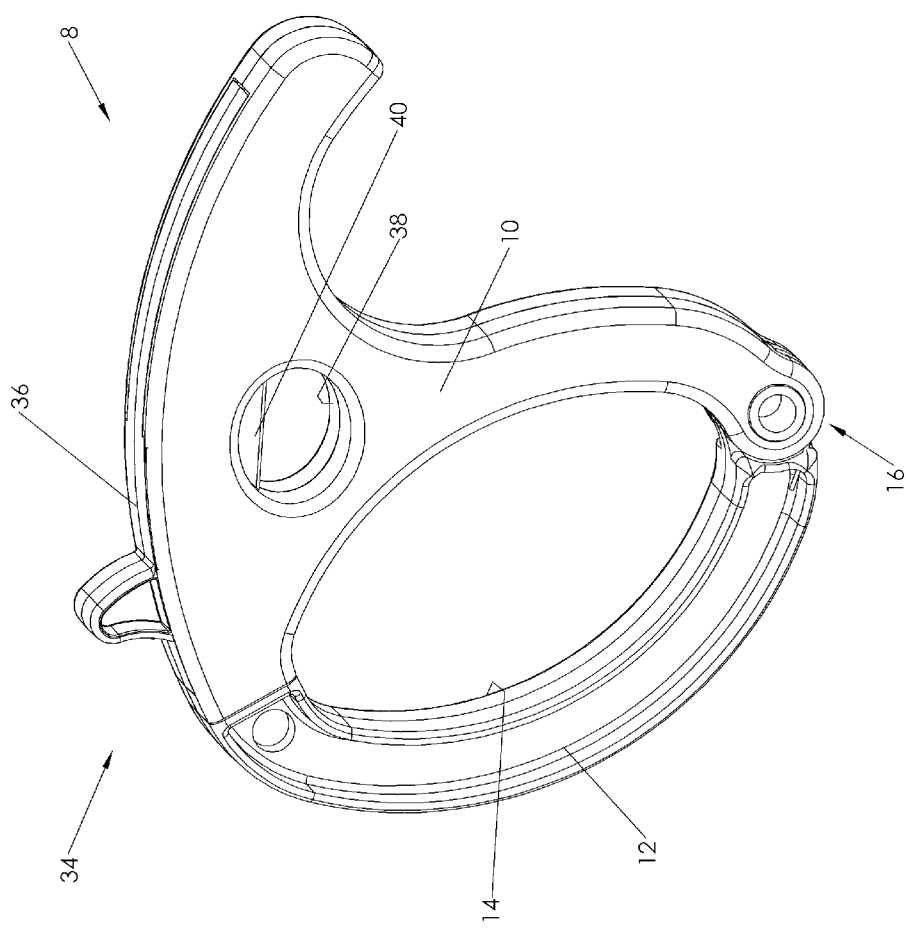
FIG. 1 is a perspective view of a particular embodiment holder fully assembled and in the closed position.
Figure 2:
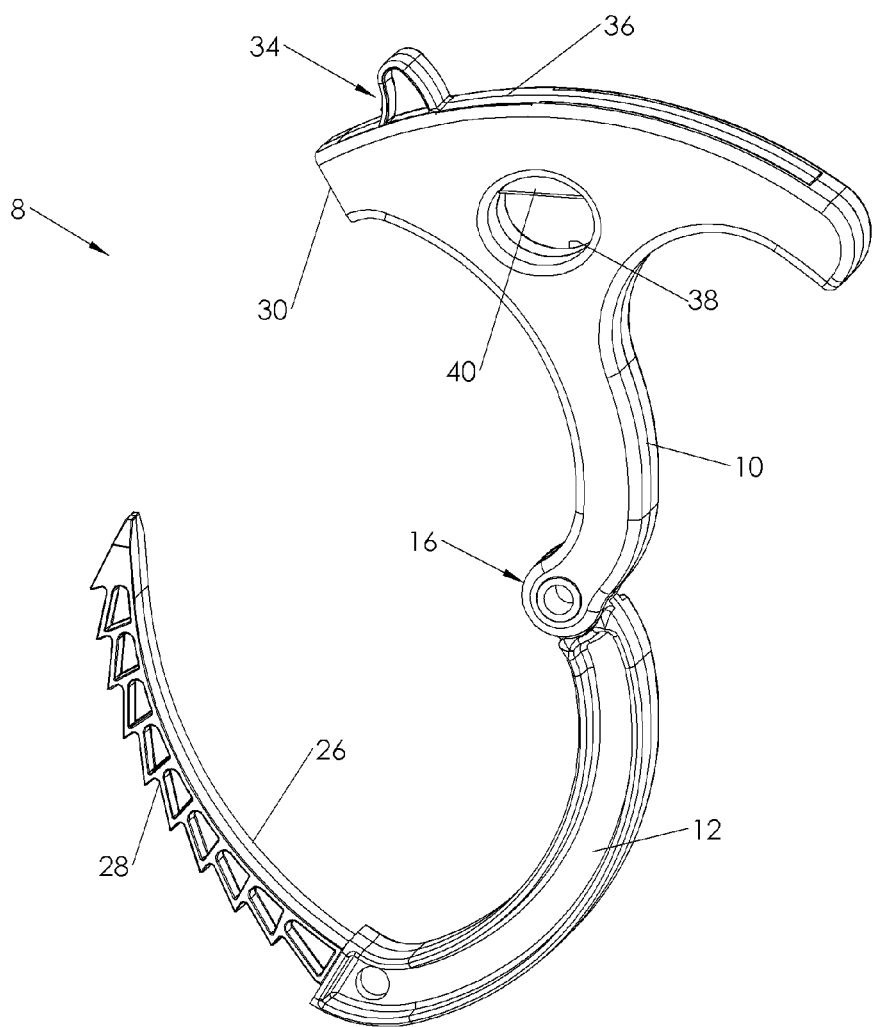
FIG. 2 is a perspective view of the holder of FIG. 1 in the open position.

Accordingly, there are a variety of cable holder implementations. One particular embodiment of a mobile cable holder 8 may comprise a body 10, an arm 12, and an orifice 14, as particularly seen in FIGS. 1-3. Arm 12 is configured such that it can be in a closed position as seen in FIG. 1 or an open position in relation to body 10 as seen in FIG. 2. For instance when arm 12 is in a closed position, as in FIG. 1 and FIG. 3, arm 12 and body 10 together at least partially define orifice 14. When arm 12 is in the closed position, it generally will not move into the open position without user intervention. Arm 12 can be in an open position as well, as shown in FIG. 2. This is useful in that the arm may be placed in the open position in order to put mobile cable holder 8 around a loop of cable, and then arm 12 may be placed in the closed position (placing the cable within the orifice) to allow for easy carrying, holding, and storage of the cable.

Any mechanism or device can be used to allow arm 12 to move in an open and closed position in relation to the body. For instance, arm 12 could comprise a screwable element screwed into a portion of the body such that by screwing in one direction it would cause arm 12 to be in a closed position and by screwing in another direction it would cause arm 12 to be in an open position. Arm 12 could also comprise a piston/spring element such that the spring tends to hold the arm in a closed position and depressing the arm would cause it to be in an open position. In the embodiment represented in FIGS. 1-3, mobile cable holder 8 comprises a hinge 16 which allows arm 12 to swing into an open position and swing back into a closed position. Hinge 16 may include a male hinge element 18, located on body 10, and a female hinge element 20, located on arm 12. When engaged together, male hinge element 18 and female hinge element 20 allow arm 12 to rotate about an axis 22 between an open and a closed position.

Figure 3:
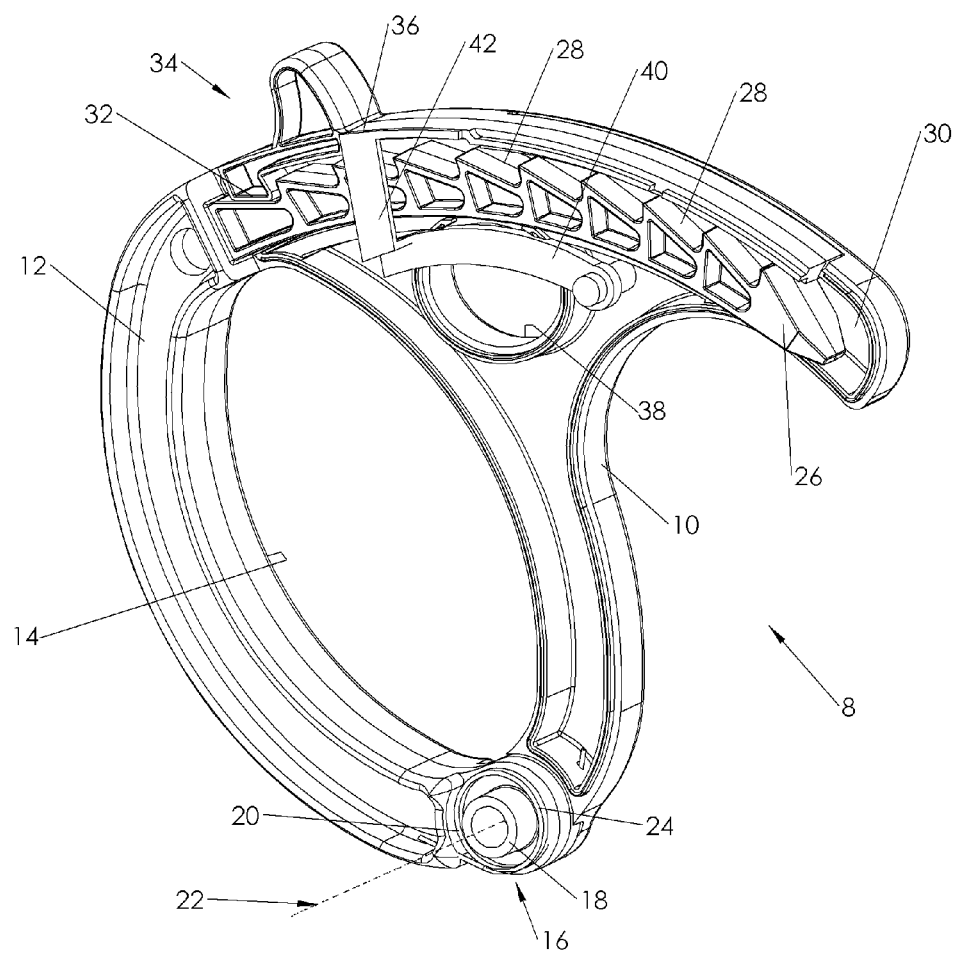
FIG. 3 is a perspective view of the holder of FIG. 1 with an outer cover of the body removed to expose the internal components; and, FIG. 4 is a front elevation view of a particular embodiment holder fully assembled and in the closed position.

In the embodiment shown in FIGS. 1-3, hinge 16 further comprises a spring 24, which may include, but is not limited to, a torsion spring, a leaf spring, a coil spring, wave spring, volute spring, or any other suitable spring mechanism, placed over male hinge element 18 and configured to produce a first force on at least one of arm 12 and body 10. Torsion spring 24 may be biased to force arm 12 into the open position, or the torsion spring may be biased to force arm 12 into the closed position.

For the particular embodiment shown in FIGS. 1-3, torsion spring 24 is biased to force arm 12 into the closed position. Torsion spring 24 is not required for biasing, however, and any other mechanism, device, or element could be used to bias arm 12 into either the open position or the closed position. If an element was used to bias the arm into a closed position, the mobile cable holder could comprise another element that would be used to push the arm into the open position although it is biased towards the closed position.

Arm 12 may further comprise an arm extension 26. Arm extension 26 may have notches 28 formed therein that may work in conjunction with several other elements to perform a variety of functions. For instance, the mobile cable holder may further comprise an arm extension retainer or receiving opening 30, and a projection 32, and the mobile cable holder may be configured such that arm extension 26 may extend various depths into receiving opening 30 and may be held at various depths by the projection 32 being lodged into one of notches 28.

The mobile cable holder may also comprise a plurality of projections (not shown) for a stronger grip arm extension 26. Providing a plurality of projections may be achieved by varying the location of the arm extension between various fixed positions within the arm extension retainer, thereby allowing the size of orifice 14 to vary in different closed positions. This may allow a user to secure the mobile cable holder snug around various amounts and sizes of cable or other items. For instance, for a small amount or size of cable, a smaller orifice may be desired to hold the cable snugly or allow less movement of the cable in the mobile cable holder. Nevertheless, if the user wants to permit movement of the cable within the mobile cable holder, he could alter the size of the orifice accordingly. For larger cable sizes or larger amounts of cable, the user may need to use a larger orifice in order to enclose the loop of cable. The user could then alter the depth of arm extension 26 within arm extension retainer 30 to alter the size of orifice 14 accordingly.

These various elements and any others could be configured such that the orifice 14 can be opened along a continuum of different sizes from a fully closed to a fully open position or such that orifice 14 only varies along a limited number of discrete positions. As can be envisioned from FIG. 3, these various elements may also be configured such that once projection 32 is lodged within notch 28, arm 12 may be pushed into a more closed position and the movement of arm extension 26 alone will cause projection 32 to exit the notch it is in and then fall in the next notch, and so forth, while at the same time preventing movement of arm 12 towards the open position without a manual release of the projection from a notch due to the ramp-like configuration of the notches in this particular embodiment.

The mobile cable holder may further comprise a finger grip 34 as seen in FIGS. 1-3 which may fulfill a variety of functions. For instance, finger grip 34 may be useful to more easily grip the mobile cable holder. The finger grip may also serve other functions, such as maintaining projection 32 so it is possible to manipulate finger grip 34 as seen in FIG. 3. For example, pulling finger grip 34 back at a certain angle will release projection 32 from its lodging in notch 28, thus allowing arm 12 to be moved towards the open position.

Further, mobile cable holder 8 may further comprise a lever 36 pivotably mounted to body 10 which may tend to keep projection 32 lodged in notch 28. Lever 36 may be configured to create enough downward pressure into notch 28 such that although arm 12 is closed or open biased, once projection 32 is within a notch, the projection will not move out of that notch without user intervention. Further, lever 36 may at least partially surround a portion of receiving opening 30.

As can also be seen from FIGS. 1-3, the mobile cable holder may further comprise an aperture or finger opening 38. Finger opening 38 may be configured to allow the user to more easily hold the mobile cable holder during use. However, the finger opening may also serve other functions. For instance, as seen in FIG. 2, the mobile cable holder may further comprise a trigger 40 for engaging lever 36, the trigger residing at least partially within finger opening 38. As can be envisioned, when trigger 40 is pushed in an upwards direction, it may contact lever 36 through a post 42, thereby forcing projection 32 upwards and releasing the projection from the notch in which it is lodged and allowing arm extension 26 to move towards the open position or to move more easily into a more closed position. Advantageously, movement of trigger 40 imparts movement on the finger grip through post 42, while upward movement of finger grip 34 merely imparts movement on post 42 and does not move trigger 40.

Further, any suitable mechanism, device, or method may be used to bias lever 36 downwards towards post 42 and tending to push the projection downward into a notch. For instance the mobile cable holder may be manufactured such that lever 36 is in a relaxed state in its downward position, and that as a notch passes by the projection it pushes the lever up into a state of compression or elongation, such that the lever's natural tendency is to return to the closed or downward position once the notch has passed by the projection, thus resting the projection in the next notch.

Still further, arm 12 may be composed of any suitable material depending on the desired property of the arm. If a rigid arm is desired, a harder and more impact resistant material will preferably be utilized, while a softer and more flexible material will be used if a flexible arm is desired. In addition, arm 12 may be manufactured from two different materials if a user wants a flexible arm 12 with a rigid arm extension 26.

Figure 4:
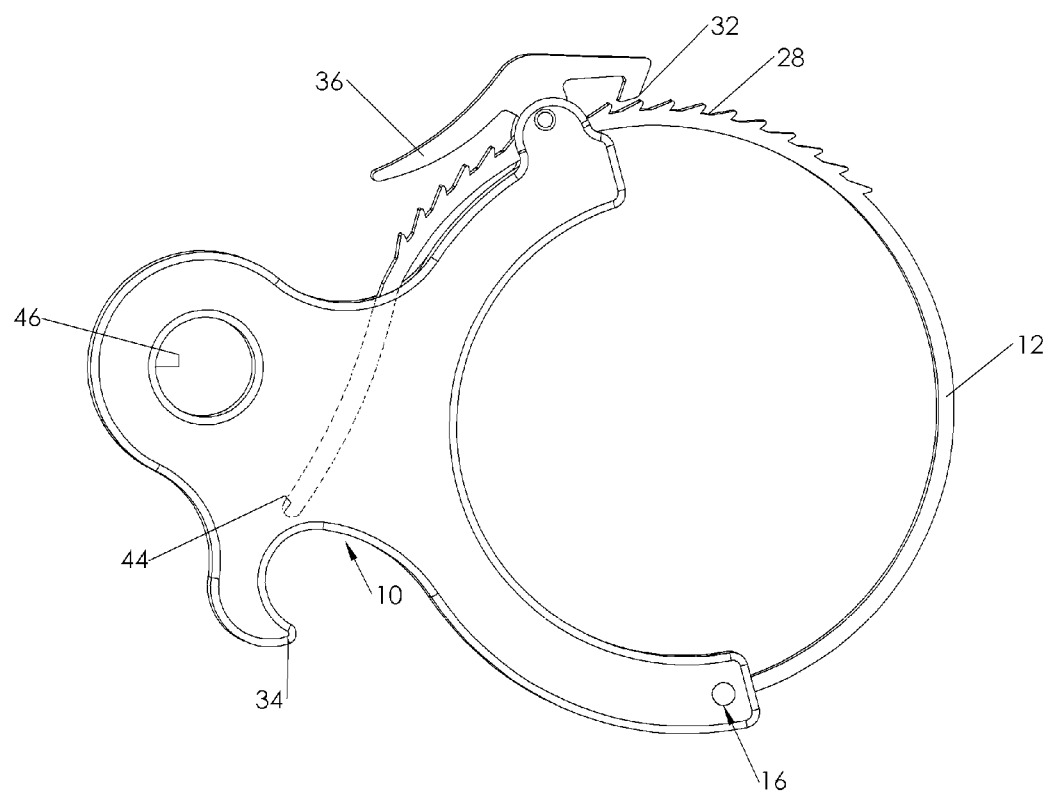

Another particular implementation, shown in FIG. 4, comprises a body 10, a flexible arm 12, and an orifice 14. Flexible arm 12 may be configured such that it can be in an open or a closed position in relation to the body. For instance, when flexible arm 12 is in a closed position, as in FIG. 4, flexible arm 12 and body 10 together define orifice 14. When flexible arm 12 is in the closed position, it generally will not move into the open position without user intervention.

The flexible arm can also be manipulated into an open position as well (not shown) in order to put the mobile cable holder around a loop of cable, and then the flexible arm may be placed in the closed position (placing the cable within the orifice) to allow for easy carrying, holding, and storage of the cable.

One advantage of the flexible arm is that it may allow a user to carry objects of various sizes and shapes. For instance, the flexibility of the flexible arm may allow the flexible arm to conform to the shape of an object in order to allow the object to be more firmly held within the orifice than with a rigid arm. In this way, an embodiment with a flexible arm may allow objects to be carried that would not be able to be carried by an embodiment with a rigid arm. For instance, rigid objects with obscure cross-sections may be difficult to secure within orifice 14. Using the embodiment with a flexible arm, this problem may be eliminated as the flexible arm effectively allows the orifice to change shape.

Any mechanism or device can be used to allow the flexible arm to move in an open and closed position in relation to the body. In the embodiment represented in FIG. 4, the mobile cable holder comprises a hinge 16 which allows the flexible arm to swing back and forth from an open position into a closed position. The hinge in FIG. 4 comprises a male hinge element located on the body and a female hinge element located on the flexible arm, similar to the first particular embodiment. When placed one over the other, the female and male hinge elements allow the flexible arm to rotate about an axis to aid in placing the flexible arm in the open and closed positions.

Hinge 16 may be biased such that the hinge further comprises a torsion spring (not shown) similar to the first particular embodiment placed over the male hinge element and configured to produce a first force on at least one of flexible arm 12 and body 10. The torsion spring may be biased to force the flexible arm into the open position, or the torsion spring may be biased to force the flexible arm into the closed position. A torsion spring need not be used, however, for biasing, and any other mechanism, device, or element could be used to bias the flexible arm into either the open position or the closed position. If an element was used to bias the flexible arm into a closed position, the mobile cable holder could comprise another element that would be used to push the flexible arm into the open position although it is biased towards the closed position. The mobile cable holder need not comprise any element for biasing the flexible arm, however, and the mobile cable holder could function without any torsion spring or any biasing whatsoever of the flexible arm in relation to the body.

The flexible arm may have notches 28 in it and may work in conjunction with several other elements to perform a variety of functions. For instance, the mobile cable holder may further comprise a projection 32 and a lever 36, and the mobile cable holder may be configured such that the size of the orifice may be altered by altering the notch that a projection is placed into. As illustrated by FIG. 4, for example, the lever has a projection 32 thereon, and rotation of lever 36 along its axis in one direction would pull projection 32 upwards and out of notch 28 in which it is lodged. Advantageously, this allows a user to move the flexible arm back and forth in order to line up the projection with another notch and the user can then rotate the lever in the opposite direction by letting go of the lever if it is biased to the closed position or rotating the lever.

As discussed above, a biasing mechanism may be used to bias the lever in the closed position such that it would require user intervention to dislodge a projection from a notch. This biasing mechanism may be a torsion spring or anything else that could be used to bias the lever closed. The lever may be configured to have enough downward pressure to force the projection into the notch such that although the flexible arm may be closed or open biased, once the projection is in a notch it will not move out of that notch without user intervention such as by pulling on a finger grip, releasing the lever, or otherwise removing the projection from the notch. Alternatively, the biasing mechanism may be used to bias the lever into the open position. The mobile cable holder could also comprise a plurality of projections for a stronger grip on the flexible arm.

The ability to vary the location of the flexible arm between various fixed positions allows the size of the orifice to vary at various different closed positions. This may allow a user to put the mobile cable holder snug around various amounts and sizes of cable. For instance, for a small amount or size of cable, a smaller orifice may be desired to hold the cable snugly or allow less movement of the cable in the mobile cable holder. Nevertheless, if the user wants to allow movement of the cable within the mobile cable holder, he could alter the size of the orifice accordingly. For larger cable sizes or larger amounts of cable, the user may need to use a larger orifice in order to enclose the loop of cable. The user could then alter the location of the flexible arm, altering which notch the projection is in, to alter the orifice size accordingly. These various elements and any others could be configured such that the orifice can be opened along a continuum of different sizes from a fully closed to an open position or such that the orifice only vary along a limited number of discrete positions.

As can be envisioned from FIG. 4, these various elements may also be configured such that once the projection is lodged in a notch, the flexible arm may be pushed or pulled into a more closed position and the movement of the flexible arm alone will cause the projection to exit the notch it is in and then fall in the next notch, and so forth, while at the same time preventing movement of the flexible arm towards the open position without a manual release of the projection from a notch such as by depressing the lever or other mechanism used to hold the projection in place in a notch similar to the first particular embodiment.

The mobile cable holder may further comprise an arm retainer 44, and the mobile cable holder may be configured such that the flexible arm may extend various depths into the arm retainer when it has passed beyond lever 36. For instance in the embodiment in FIG. 4, arm retainer 44 is a hollow opening in the body, and the arm retainer is configured to receive the end of the flexible arm when the flexible arm is in the closed position. This may be helpful in that it may keep the slack end of the flexible arm out of the way while the user is carrying a loop of cable or other item.

The mobile cable holder may further comprise a finger grip 34 as seen in FIG. 4. Finger grip 34 may fulfill a variety of functions. For instance, finger grip 34 may be used by a user to more easily grip the mobile cable holder. The finger grip may also serve other functions, for instance the finger grip could be connected to the projection (not shown in FIG. 4). As such, it could be possible to manipulate the finger grip and projection such that imparting a force onto the finger grip, such as pulling it back at a certain angle, would release the projection from its lodging in the notch, thus allowing the flexible arm to be moved towards the open position.

The following elements described in this paragraph are not shown in a Figure for the second particular embodiment. The mobile cable holder may further comprise a finger opening. The finger opening may be configured to allow the user to more easily hold the mobile cable holder during use. However, the finger opening may also serve other functions as well. The mobile cable holder may further comprise a trigger engaging the lever, the trigger residing at least partially in the finger opening. When the trigger is pushed in an upwards direction, it will push the lever, and therefore the projection, in an upwards direction, releasing the projection from the notch in which it is lodged and allowing the arm extension to move towards the open position or to move more easily into a more closed position. Any suitable mechanism, device, or method may be used to bias the lever towards a downward projection, tending to push the projection downward into a notch. For instance the mobile cable holder may be manufactured such that the lever is in a relaxed state in its downward position, and that as a notch passes by the projection it pushes the lever up into a state of compression or elongation, such that the lever's natural tendency is to return to the closed or downward position once the notch has passed by the projection, thus resting the projection in the next notch.

As can be seen from FIG. 4, the mobile cable holder may further comprise a hanging hole 46. Hanging hole 46 may be used to hang the mobile cable holder on a nail, rod, or other item for storage, either when the mobile cable holder is not in use or when the mobile cable holder is holding a loop of cable or other item. The hanging hole could also double as a finger opening. The mobile cable holder could comprise any other mechanism or element to allow hanging or storage of the mobile cable holder without using a hanging hole, however. For instance the mobile cable holder could comprise a hook such that could be hanged on a nail, and so forth.

In these and in any other embodiments, the mobile cable holder may be made of any materials and fabricated and/or assembled in any manner. For instance the mobile cable holder may be manufactured from various different pieces and then screwed or glued together. In one embodiment for instance the body is molded of two pieces of plastic which are then ultrasonic welded together. The various elements, such as a lever, a finger opening, a body, a finger grip, a projection, and so forth, may be manufactured as one piece or may be manufactured as separate pieces to be joined together.

It will be understood that implementations are not limited to the specific components disclosed herein, as virtually any components consistent with the intended operation of a method and/or system implementation for a mobile cable holder may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for a mobile cable holder. Implementations are not limited to uses of any specific components, provided that the components selected are consistent with the intended operation of a method and/or system implementation for a mobile cable holder.

Accordingly, the components defining any mobile cable holder implementation may be formed of any of many different types of materials or combinations thereof that can readily be formed into shaped objects provided that the components selected are consistent with the intended operation of a mobile cable holder implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any mobile cable holder implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The use of a mobile cable holder may comprise the following steps: winding up a cable on a mobile cable holder while a rigid/flexible arm is in an open position; placing the rigid/flexible arm in a closed position; hanging/storing the cable and mobile cable holder. The use of a mobile cable holder may comprise the following steps: winding up a cable; placing a mobile cable holder around the wound cable by placing the open rigid/flexible arm around the wound up cable and placing the rigid/flexible arm in a closed position, thus retaining the wound up cable in an orifice of the mobile cable holder; and hanging/storing the cable and mobile cable holder.

The implementations listed here, and many others, will become readily apparent from this disclosure. From this, those of ordinary skill in the art will readily understand the versatility with which this disclosure may be applied.

The invention claimed is:

1. A device holder comprising:
a body having a receiving opening;
an arm having an engagement member for releasably securing the engagement member within the receiving opening;
a hinge rotatably connecting the body and the arm;
a spring communicating with the arm and the body such that the spring biases the arm and the body to a closed position;
an aperture disposed in the body and having a longitudinal axis substantially parallel to a rotational axis of the hinge; and
a trigger operatively connected to the body for releasing the engagement member and the receiving opening, the trigger being operable from within the aperture.

2. The holder of claim 1 wherein engagement of the engagement member and the receiving opening selectively prevents the holder from moving into an open position.

3. The holder of claim 1 wherein the body and the arm define an orifice for receiving an article.

4. The holder of claim 3 wherein a size of the orifice is controlled by selective engagement of the plurality of notches.

5. The holder of claim 1 further comprising a finger grip extending from the body and linked with the trigger.

6. The holder of claim 1 wherein movement of the trigger imparts movement on the finger grip.

7. The holder of claim 1 wherein movement of the finger grip does not impart movement on the trigger.

8. The holder of claim 1 wherein the arm further comprises an extension member at least partially defining the engagement member and having a plurality of notches securing the arm within the receiving opening.

9. The holder of claim 1 wherein the spring is a torsion spring.

10. The holder of claim 9 wherein the lever is pivotably mounted to the body.

11. The holder of claim 1 wherein the receiving opening terminates within the body.

12. The holder of claim 1 wherein the body further comprises a lever at least partially surrounding the receiving opening.

13. The holder of claim 12 wherein the lever further comprises a projection extending into the receiving opening.

14. The holder of claim 13 wherein the projection contacts a plurality of notches on the engagement member.

15. The holder of claim 14 wherein the projection permits movement of the engagement member in a first direction and selectively prevents movement of the engagement member in a second direction opposite the first direction.

16. The holder of claim 1 wherein the arm is rigid.

17. The holder of claim 1 wherein the arm is flexible.

18. A device holder comprising:
a body having a receiving opening;
an arm having an engagement member for releasably securing the engagement member within the receiving opening;
a hinge rotatably connecting the body and the arm;
a spring communicating with the arm and the body such that the spring biases the arm and the body to a closed position;
an aperture disposed in the body and having a longitudinal axis substantially parallel to a rotational axis of the hinge; and
a lever operatively connected to the body for releasing the engagement member and the receiving opening, the lever engaging the engagement member externally of the body.

19. The holder of claim 18 wherein a projection extends from the lever to engage one of a plurality of notches of the engagement member.

20. The holder of claim 18 wherein a free end of the arm is received within the body.

* * * * *